United States Patent [19]

Ines

[11] Patent Number: 4,852,924
[45] Date of Patent: Aug. 1, 1989

[54] PET'S EXCREMENT COLLECTOR
[76] Inventor: Veronica L. Ines, 1745 Bryers Rd., Hatboro, Pa. 19040
[21] Appl. No.: 245,454
[22] Filed: Sep. 16, 1988
[51] Int. Cl.⁴ .......................... A01K 29/00; E01H 1/12
[52] U.S. Cl. .................................................. 294/1.5
[58] Field of Search .................... 294/1.3–1.5, 294/19.1, 55; 15/104.8, 257.1, 257.4, 257.6, 257.7; 119/1; 248/95, 99–101

[56] References Cited
U.S. PATENT DOCUMENTS

| | | | |
|---|---|---|---|
| 3,786,780 | 1/1974 | Pezzino | 294/1.5 |
| 4,012,067 | 3/1977 | Travis | 294/1.4 |
| 4,146,260 | 3/1979 | Carrington | 294/1.5 |
| 4,236,741 | 12/1980 | Emme | 294/1.5 |
| 4,717,186 | 1/1988 | Yoshioka | 294/1.5 |

FOREIGN PATENT DOCUMENTS

| | | | |
|---|---|---|---|
| 2804553 | 8/1979 | Fed. Rep. of Germany | 294/1.5 |
| 7902410 | 9/1980 | Netherlands | 294/1.5 |

Primary Examiner—Johnny D. Cherry

[57] ABSTRACT

A pet's excrement collector characterized by comprising a circular frame, a telescopic handle and an elastic corded bag and being so constructed that it is convenient for use to collect pet's excrement outdoors.

1 Claim, 3 Drawing Sheets

PET'S EXCREMENT COLLECTOR

BACKGROUND AND SUMMARY OF THE INVENTION

This invention relates to a pet's excrement collector which is convenient and sanitary to collect pet's excrement outdoors.

With the quality of human life improving, more animals have been kept as pets around the world. Pets can make interesting, playful companions. People like them to be delightful and loyal and enjoy teaching them to do tricks and to obey commands. In addition to providing companion, pets are a live teaching aid to children.

However, it is quite an annoyance to collect pet's feces. People are often embarrassed to find their pets contaminating the environment with their excrement and do not know what to do. Many U.S. cities provide that the master will be fined US$150.—or more if his pet empties its bowels on the road or in the public place.

In view of the above, the present invention was developed. Consisting of a circular frame, a telescopic handle and an elastic corded bag, the pet's excrement collector of the present invention is very convenient for the master to carry along and to collect feces outdoors.

So the main object of this invention is to provide a pet's excrement collector which can be used to collect pet's feces, to protect the environment from being contaminated, and to keep the interest of people in keeping pets from being reduced by the excrement problem.

Another object of this invention is to provide the masters who like to engage in outdoor activities with their pets a pet's excrement collector which is convenient to carry along and to collect the feces of their pets outdoors so as to avoid penalty for their pets contaminating the public place.

DETAILED DESCRIPTION OF THE PREFERRED EMBODIMENT

Figure 1:
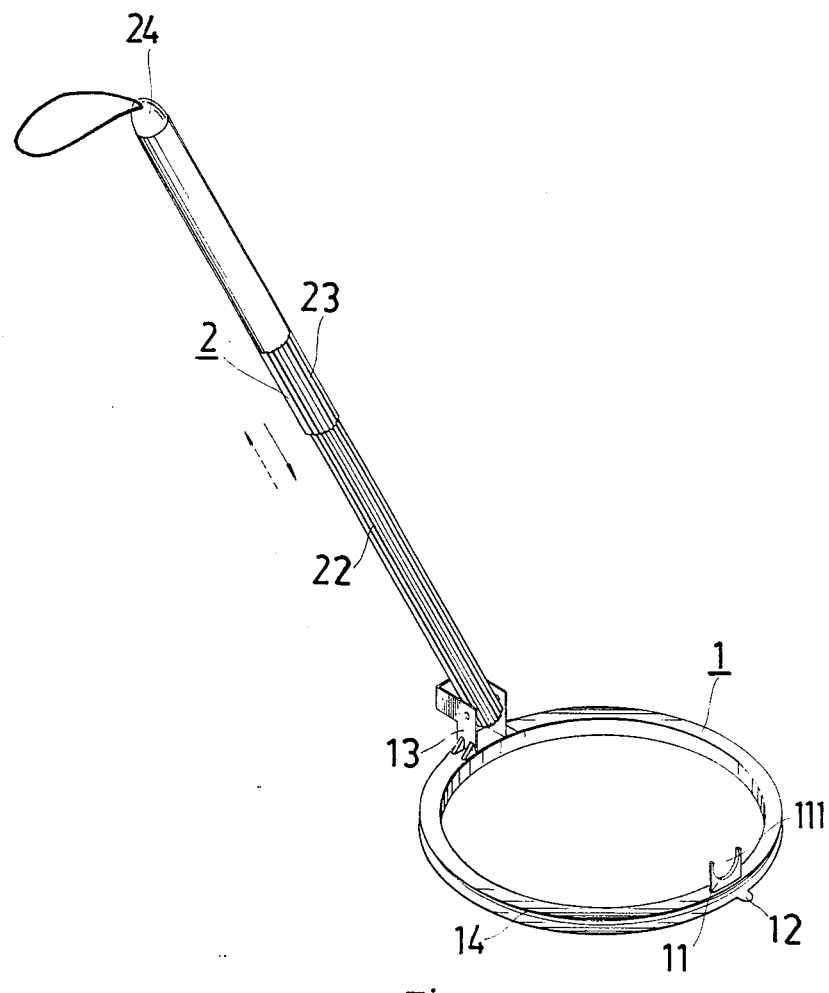
FIG. 1 is a vertical view of the pet's excrement collector of this invention.
Figure 3:
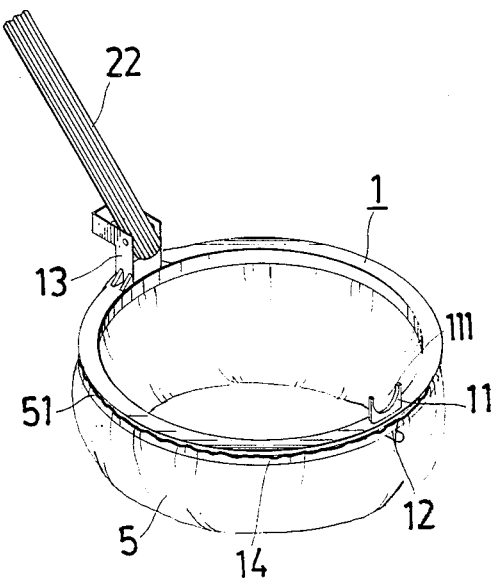
FIG. 3 illustrates the said pet's excrement collector with a plastic bag ready for use.

Referring now to the drawings, the nature of this invention is described in detail as follows:

As shown in FIGS. 1 and 3, the pet's excrement collector comprises a circular frame 1, a telescopic handle 2 and an elastic corded bag 5. The circular frame 1 has a circular groove 14 for the bag 5 to mount, a support 11 to support the telescopic handle 2, an L connector 13 to connect the circular frame 1 and telescopic handle 2 in an angle of elevation of 135° for easy holding, and two lugs 12 on the opposite parts of the frame 1 under the support 11 and L connector 13 for hooking the bag 5. The telescopic handle 2 consists of a first section 22, a second section 23 and a stringed cap 24 for hanging. The bag 5 has an elastic cord 51 at the top opening. The first and second sections 22, 23 of the telescopic handle 2 have longitudinal ribs on the surface to improve the interlocking. The support 11 has a semicircular notch 111 for the second section 23 of the telescopic handle 2 to snap into.

Figure 2:
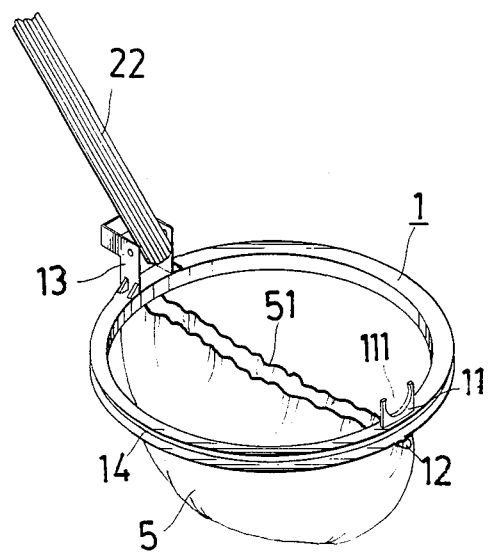
FIG. 2 illustrates the attaching of the elastic corded bag to the circular frame of the said collector.

For use, the elastic corded bag 5 is first stretched and hung on the lugs 12 as shown in FIG. 2. Then it is expanded and attached to the circular groove 14 of the circular frame as shown in FIG. 3. So it is very easy to prepare the collector for timely use after the master finds that his pet is going to empty its bowels. Usually, a pet will adapt to it after practicing one or two times.

Figure 4:
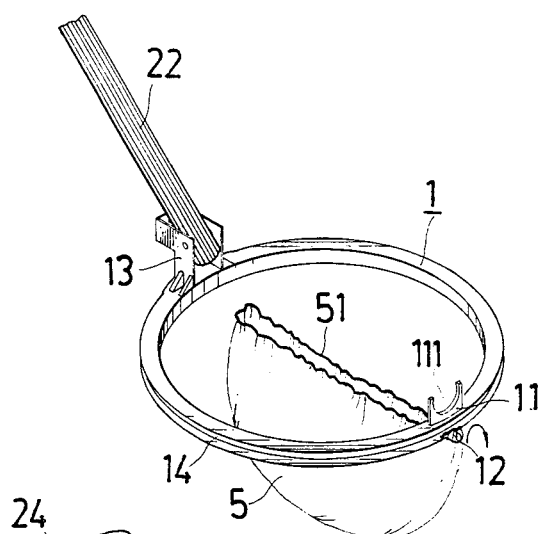
FIG. 4 illustrates the removing of the said bag after use.

As shown in FIG. 4, the bag 5 can be removed after use and discarded with the excrement in the nearby garbage can.

Figure 5:
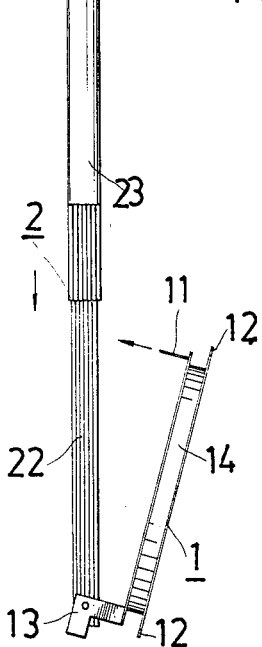
FIG. 5 illustrates the folding of the circular frame of the said collector.
Figure 6:
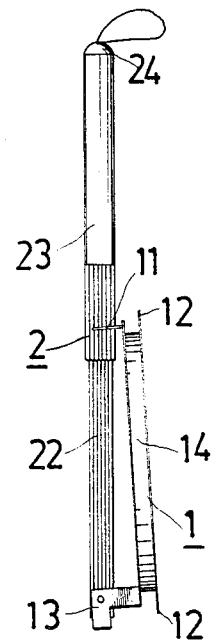
FIG. 6 illustrates the telescopic handle with the second section snapped in the support of the circular frame.

The circular frame 1 is folded up as shown in FIG. 5. Then the second section 23 of the telescopic handle 2 is pressed down and fitted on the first section 22 and after being snapped in the notch 111 of the support 11, it is ready for carrying as shown in FIG. 6.

I claim:
1. A pet's excrement collector characterized by comprising:
   a circular frame having a circular groove, a notched support, an L connector and two lugs,
   a telescopic handle movably connected to the circular frame at the lower end by means of the L connector and having two ribbed sections that slide one in another, and a cap with a string for hanging purpose, and
   a plastic bag having a built-in elastic cord at the top opening for removably attaching to the groove of the circular frame,
   and being constructed in such way that it is convenient for use to collect pet's excrement outdoors.

* * * * *